Aug. 17, 1937.  W. EPPENBACH  2,090,578
COLLOIDAL MILL
Filed July 10, 1934  3 Sheets-Sheet 1
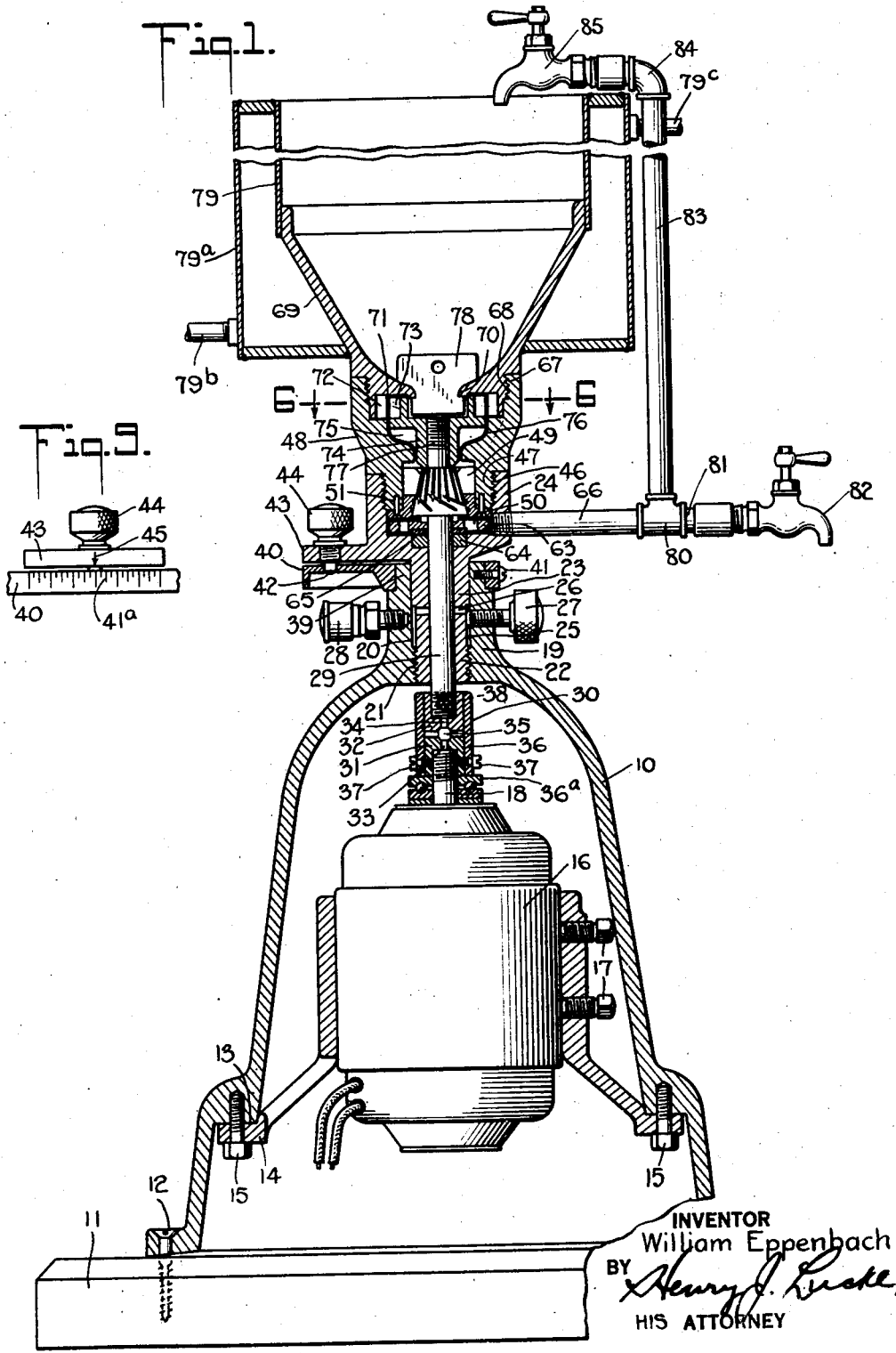
INVENTOR
William Eppenbach
BY
Henry J. Lucke,
HIS ATTORNEY Aug. 17, 1937.   W. EPPENBACH   2,090,578
COLLOIDAL MILL
Filed July 10, 1934    3 Sheets-Sheet 2
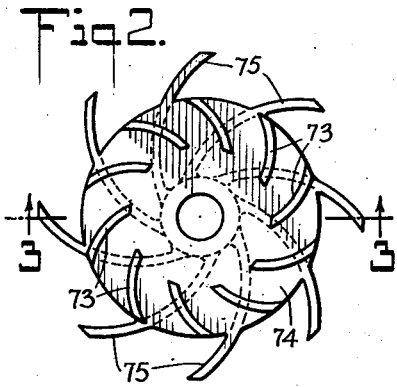
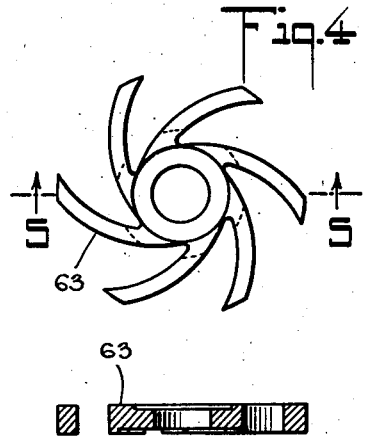
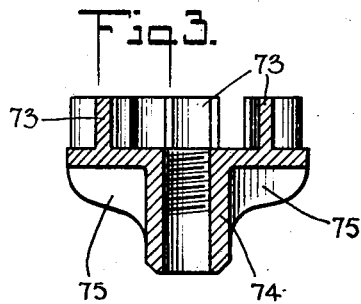
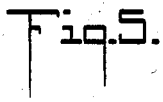
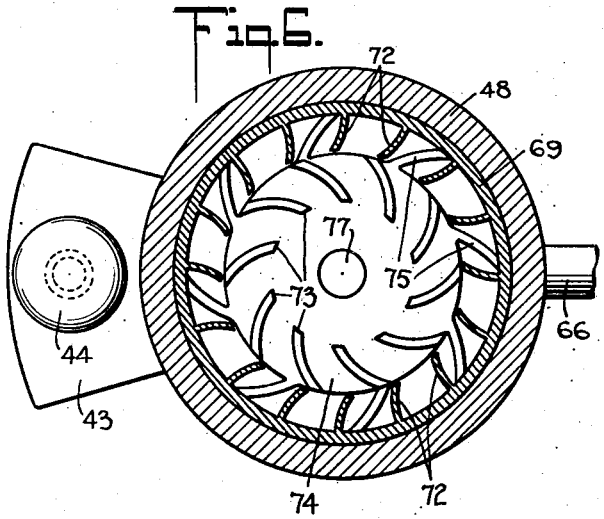
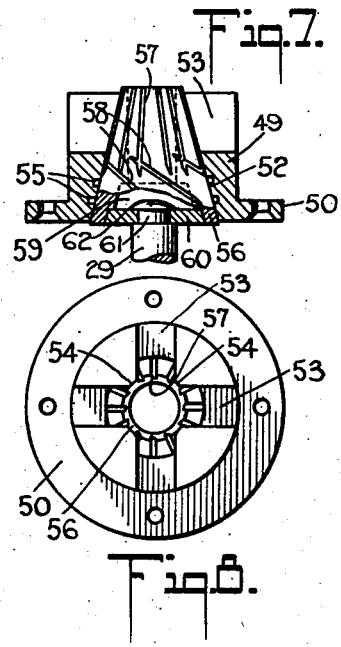
INVENTOR
William Eppenbach
BY
HIS ATTORNEY Aug. 17, 1937.  W. EPPENBACH  2,090,578
COLLOIDAL MILL
Filed July 10, 1934  3 Sheets-Sheet 3
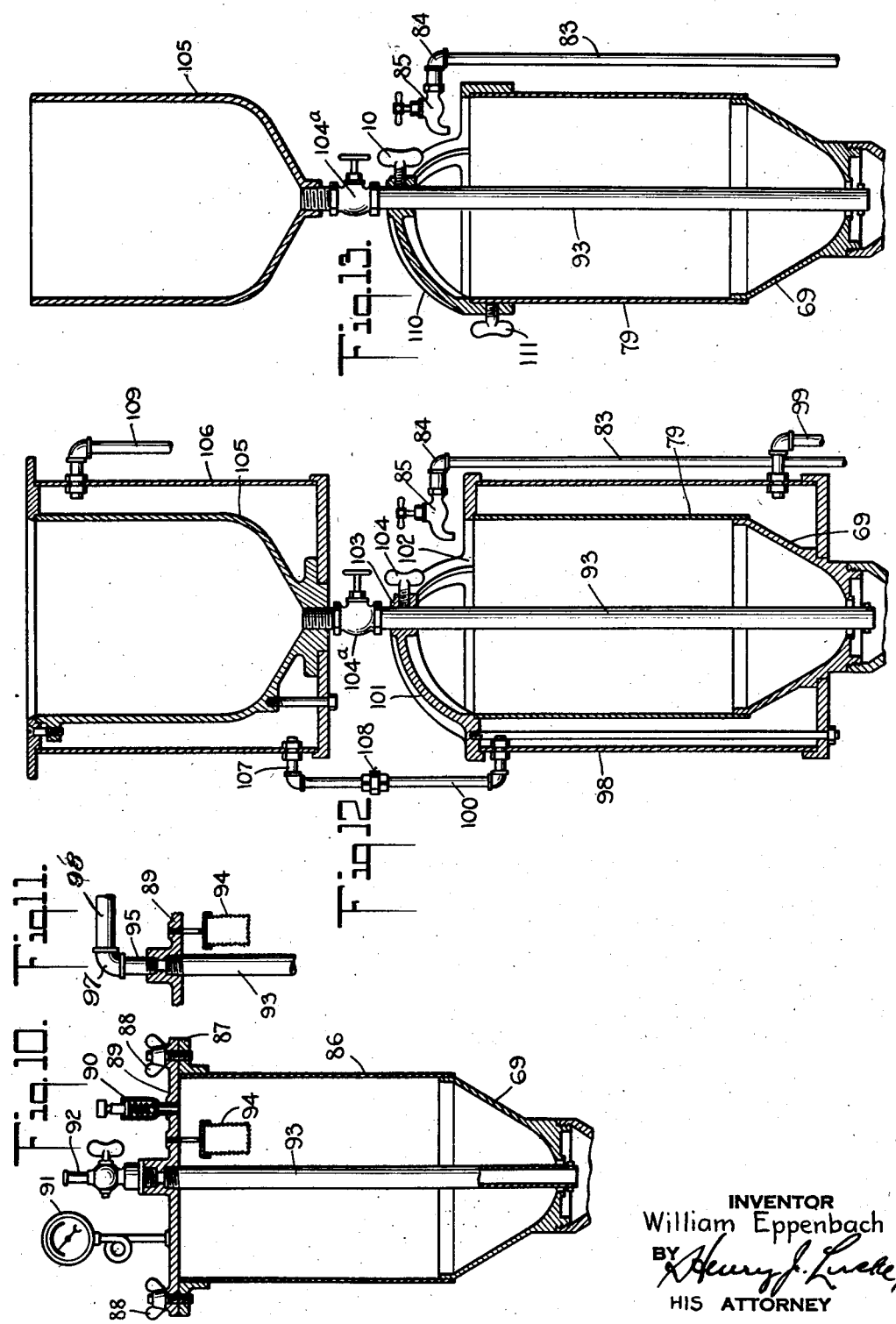
INVENTOR
William Eppenbach
BY Henry J. Lueke
HIS ATTORNEY Patented Aug. 17, 1937

2,090,578

UNITED STATES PATENT OFFICE 2,090,578

COLLOIDAL MILL

William Eppenbach, Grenwolde, Great Neck, Long Island, N. Y.

Application July 10, 1934, Serial No. 734,463

4 Claims. (Cl. 83—13)

My present invention relates to grinding mills and more particularly to an improved colloid or homogenizing mill.

My present invention is an improvement over former mills of this type, and contemplates the use of means for preventing turbulence of the material prior to its being worked upon, in combination with a battery of turbine impellers for creating turbulence and pressure and forcing the material to the grinding device proper. Such grinding device is novel in principle and construction, and is readily adjustable to insure grinding of the material to any desired degree of fineness. Also, when such material is ground in the presence of any suitable immunizing agent, as invert sugar, or equivalent substance, glucose, honey, molasses, or the like, each particle of the comminuted material is thoroughly coated, or capsulized, with the immunizing agent. My improved mill may be of any desired size, from one adapted for household use to the largest size suitable for commercial use. Particularly, my device is adapted to be used for carrying out the improved process and the production of the product disclosed and claimed in my co-pending application, Serial No. 585,667, filed January 9, 1932.

Further, my improved device is not restricted to the use of immunizing edible materials, but may be used to advantage in the preparation of perfumes, paints, soaps, and the like. Also, the device is admirably adapted to be used as an ordinary grinding mill and for the same purpose thereas.

It is adapted to be used as a pre-mixing device, and as an homogenizing, immunizing, grinding and capsulizing device in the preparation of foods without danger of devitalizing the same. It may be used in the home for the homogenizing and grinding of raw, uncooked or semi-cooked foods, such as infants' food, invalids' food, jams, jellies and the like. And is particularly adapted for use in the preparation of raw food utilized in liquid diets, and in the preparation of such foods as raw liver, used extensively in the treatment of pernicious anemia. It may also be used in the preparation of medicines, such for example, as iron, calcium and phosphates, where the capsulizing of such substances is an essential in the treatment of certain forms of tuberculosis. Further, the invention may be utilized for the making of a synthetic milk by using, for example, a fluid, as water in combination with a skim milk powder and olive oil.

The object of my invention, therefore, is an improved colloidal mill.

In the accompanying drawings illustrating preferred embodiments of my invention:

Fig. 1 is a central sectional elevation;

Fig. 2 is a plan view of the pressure turbine;

Fig. 3 is a sectional elevation on the line 3—3 of Fig. 2;

Fig. 4 is a plan view of the discharge turbine rotor;

Fig. 5 is a sectional elevation on the line 5—5 of Fig. 4;

Fig. 6 is a sectional plan view on the line 6—6 of Fig. 1;

Fig. 7 is a sectional elevation of the insert stator with the insert rotor in elevation and in position in the stator;

Fig. 8 is a top plan view of the structure shown in Fig. 7;

Fig. 9 is a front elevation of the grinding gap adjusting device;

Fig. 10 is a sectional elevation of a modified form of inlet funnel;

Fig. 11 is an elevation of an auxiliary air or gas nozzle to be used in connection with the structure shown in Fig. 10;

Fig. 12 is a sectional elevation of another modified form of inlet funnel; and

Fig. 13 is a sectional elevation of still another modified form of inlet funnel.

Referring to the drawings, 10 designates a mill frame and motor housing adapted to be secured to any suitable support, as the support 11, and in any convenient manner, as for example, by means of the screws 12. The mill frame and motor housing 10 has formed on the inside thereof and adjacent to the lower portion, a ledge 13 which forms a seat for the upwardly extending motor supporting frame 14.

Bolts 15 secure the motor supporting frame 14 to the housing 10. The motor supporting frame 14 is cored or machined to receive any suitable driving motor, or other prime mover 16, screws 17, extending through the wall of the motor frame 14, being utilized to adjustably mount the motor 16 in position relative to the housing 10. As constructed, the motor 16 has its drive shaft 18 arranged perpendicularly and substantially centrally of the mill frame and motor housing 10, and at the upper end of the motor housing is provided a hub or boss 19 which is drilled to provide a cylindrical passage 20 in axial alignment with the drive shaft 18 of the motor 16. The lower end of the passage 20 is internally threaded as indicated at 21 to receive the external threads 22 formed on the lower shank end 23 of an outlet housing 24. The shank 23 is rotatably mounted in the passage 20, and intermediate the ends of the shank 23 is formed an annular recess 25 and also a through oil passage 26. Threaded through the wall of the hub 19 is a thumb set screw 27 which is utilized to hold the shank 23 and therefore the outlet housing 24 against rotative movement in the hub 19. Also threaded through the wall of the hub 19 is the oil or grease cup 28 which delivers lubricant to the annular passage 25 in the shank 23 and which lubricant passes into and through the oil hole 26.

The shank 23, as well as the lower end of the outlet housing 24, is drilled to receive as a rotating fit a mill shaft 29. This shaft 29 is in axial alignment with the drive shaft 18 of the motor 16 and is connected to such drive shaft 18 by means of the flexible coupling 30.

This flexible coupling is formed of a lower member 31 threaded to screw onto the outer or upper end of the drive shaft 18 and a member 32 threaded to screw onto the lower threaded end of the mill shaft 29. The lower member 31 and the upper member 32 are drilled axially as indicated at 33 and 34, respectively, and the adjoining ends of the upper and lower members 31 and 32 are cupped to form a seat for a hardened steel ball 35, which steel ball acts as a separating member for the upper and lower members 31 and 32 and also as means for maintaining them in position relative to each other. The upper and lower members 31 and 32 are enclosed in a tube 36 of flexible material, such as a section of rubber hose. In addition to the threaded connection between the shaft 18 and the lower member 31, there is provided additional connecting means, as screws 37. Also, at the upper end of the tubular member 36 and passing through the upper member 32 are set screws 38. Between the lower end of the coupling member and the upper end of the frame of the motor 16, is a thrust bearing 36a.

The upper end of the hub 19 is reduced in diameter as indicated at 39 to receive a member 40, this member being held rigidly in position on the reduced portion 39 of the hub 19 by the set screw 41. The outer face of the member 40 is graduated as indicated by the numeral 41a and is also provided on its top face with a perforation 42 for a purpose to be hereinafter described. Adjacent the joining portion of the shank 23 and the outlet housing 24 is formed an extension 43 through which is threaded an adjusting thumb set screw 44. The outer edge of the member 43 is practically coincident with the outer edge of the member 40 and such outer edge is provided with an indicating arrow 45. The rotative movement of the outlet housing 24 with respect to the hub 19 may be regulated and visually indicated by means of the arrow 45, graduations 41a and the thumb set screw 44, it being understood that before any graduation is made, the thumb set screw 44 is backed off to release the shank 23 and allow rotative movement thereof.

The upper end of the outlet housing 24 is internally threaded at 46 to receive the external threads 47 of the lower end of a turbine housing 48. The lower portion of the turbine housing 48 is machined to receive the reduced end of a stator insert 49, such stator insert being provided on its lower end with a flange 50, screws 51 passing through the flange 50 and into the lower end of the turbine housing 48 to hold the same in position.

Referring to Figs. 7 and 8, it will be noted that such stator insert 49 is provided with a tapered passage 52 extending longitudinally therethrough, and that the upper end of the body thereof is provided with passages 53 extending diametrically thereof to in this manner provide tapered bearing surfaces 54 having relatively sharp edges thereon and coincident with the surface of the tapered passage 52. Also in the body of the stator insert and on the interior of the tapered passage 52 are formed a plurality of annular recesses 55 for a purpose to be hereinafter described.

Rotatively and adjustably mounted in the tapered passage 52 is a rotor 56, such rotor in the upper portion thereof being provided with a plurality of spaced grooves 57, extending longitudinally of the rotor. Also, on the lower end of the rotor 56 and with the upper ends intersecting the longitudinal grooves 57 are spaced grooves 58, spaced about the periphery of the rotor, such grooves 58 being angularly disposed with respect to the grooves 57. The lower end of the rotor 56 is recessed at 59 and the outer end of the recess 59 is enlarged to receive a metallic diaphragm 60 which is rigidly secured therein in any convenient manner as by staking, brazing or welding. The diaphragm 60 is relatively flexible and the central portion thereof is drilled to receive the upper reduced end 61 of the mill shaft 29, such upper end 61 being headed over as indicated at 62 to rigidly secure the flexible diaphragm 60 to the mill shaft 29.

In the outlet housing 24 below the stator insert 49 is provided a chamber in which is rotatably mounted an outlet turbine 63, such turbine being keyed or otherwise secured to the mill shaft 29. At the lower end of the chamber in which is mounted the outlet turbine 63 and in the outlet housing 24 is formed a chamber in which is placed a packing ring 64 to prevent passage of lubricant upward into the said chamber and also to prevent passage of material from the chamber through the shank 23 of the outlet housing 24. The under face of the outlet turbine 63 is recessed to receive a bearing washer 65 which bears on the washer 64. The wall of the outlet housing 24 is drilled and tapped to receive one threaded end of a pipe 66 to afford communication with the interior of the chamber holding the outlet turbine 63. The connections of the pipe 66 will be hereinafter described.

The upper open end of the turbine housing 48 is internally threaded as indicated at 67 to receive the external threads 68 on the lower reduced end of an inlet funnel 69. The funnel is shaped as shown in Fig. 1, and at its lower end there is defined a restricted central passage 70. In the body of the inlet funnel 69 and on the lower end thereof is formed a chamber 71 and on the walls of which is formed a turbine stator 72. Cooperating with the turbine stator 72 is a rotor 73 formed on the upper end of the body member 74. Also formed on the body member 74 below the rotor 73 is a rotor 75, the blades of the rotor 75 being tapered as shown in Fig. 1, and which work in a chamber 76 formed in the turbine housing 48 below the stator 72 of the inlet funnel 69. The body member 74 is axially drilled and tapped to receive the upper threaded end of a stub shaft 77 which is a drive fit in the upper end of the rotor 56, or which may be formed integral with such rotor as desired. Fitting into and extending through the restricted opening 70 of the inlet funnel 69 and cooperating with the rotor 73 is a turbulence preventer 78. As shown in Fig. 1, the inlet funnel 69 is provided on its top end with a cylindrical member 79 of any suitable material and of any suitable length, the length of the member depending on the desired capacity of the machine. As shown in Fig. 1 this cylindrical member 79 is open at its top end. Surrounding the funnel 69 and cylindrical member 79 is a jacket 79a provided with inlet and outlet pipes 79b and 79c respectively, and by means of which steam or water, or other heating or cooling fluid may be fed to the jacket. By means of the jacket 79a, the temperature of the material within the cylindrical member 79 and funnel 69 may be controlled.

The pipe 66 has secured at its outer end a T 80 and in alignment with the pipe 66 and also connected to the T 80 by means of a pipe 81 is a tap or faucet 82. Connected with the T 80 is an upright pipe 83 which extends upwardly to a point above the upper edge of the cylindrical member 79. Secured to the upper end of the pipe 83 is an elbow 84, this elbow in turn having secured thereto a tap or faucet 85 which extends over the cylindrical member 79 so as to discharge material from the pipe 83 into the inlet funnel 69.

Referring now to Fig. 10, there is shown a modified form of the structure attached to the inlet funnel 69, such member comprising the cylindrical member 86 having a flange 87 at the top end thereof and to which flange may be attached by thumb screws 88 a cover plate 89 of any suitable design. Attached to the cover 89 and communicating with the interior of the cylindrical member 86 is a safety valve 90 and a pressure gauge 91 and also attached to the cover and communicating with the interior of the cylindrical member 86 is a petcock or other equivalent structure 92. The petcock 92 is in communication with the upper open end of a pipe 93 which, as will be seen from Fig. 10, is screwed into the bottom of the cover 89 and extends downwardly into the space in which is located the rotor 73. The turbulence preventing device 78 shown in Fig. 1 may be combined with the pipe 93 or such turbulence preventing device may be removably connected therewith. Attached to the underside of the cover 89 or to the interior of the cylindrical member 86 adjacent to the top end thereof is a wire mesh basket 94 in which may be placed an inert gas in solid form, as a $CO_2$ in the form of a snow cake or the usual commercial dry ice.

The petcock 92 may be connected to any suitable source of materials to be operated upon or to a source of gas supply. In place of the turbulence preventing member 78 being attached to the pipe 93, I may provide an air or gas nozzle 95 which may be connected to any supply desired. This last named structure is clearly shown in Fig. 11 where the tube 93 is shown as being connected to the air or gas nozzle 95, the upper end being connected through an elbow 97 to a supply pipe 98.

In Fig. 12 is shown a modified form of that portion of my device from which material being worked upon is fed to the grinding device, or to which material that has been worked upon by the grinding devices is returned. In this figure the cylindrical member 79 is surrounded by a jacket 98 to which supply and exhaust pipes 99 and 100 respectively are connected. A cover 101 is provided that has an opening 102 therein to allow material to flow from the faucet or tap 85 into the cylindrical member 79 and funnel 69. Also the cover 101 is drilled to provide a supporting bearing 103 for the upper end of the pipe 93, a thumb screw 104 being employed to hold such pipe 93 in position. Mounted on the top of the pipe 93 is a control valve 104a and mounted on the valve 104a is a funnel 105 which funnel is provided with a jacket 106. The jacket 106 has a supply pipe 107 connected by union 108, to the outlet pipe 100 of the jacket 98, above described. Also the jacket 106 is provided with an outlet pipe 109.

Referring to Fig. 13 there is shown the funnel 69 and cylindrical member 79, the cover 110 being similar to the cover 101 of Fig. 12, but modified to slip over the top of the cylindrical member 79, and provided with a thumb set screw 111 to hold it in position on the cylindrical member 79. Mounted on the control valve 104a is an open top funnel 105.

The operation of the structures shown in Figs. 10, 11, 12, and 13 will be obvious from the above description and the manner in which such structures may be substituted for like structures in Fig. 1 will be readily understood by those skilled in the art.

As the motor or other prime mover 16 is ordinarily of relatively high speed and as the mechanism driven thereby may at high speeds run out of balance, I have provided the flexible coupling between the drive shaft 18 and the mill shaft 29 and have also provided the relatively flexible disks 60 attached to the upper end of the mill shaft 29. With this construction I have found that regardless of the speed at which the mill shaft 29 is driven that no whipping or undue vibration of the parts takes place. Any material placed in the inlet funnel 69 is acted upon by the rotor 73 and the stator 72 which acts to impart a certain degree of pressure to the material and force the same downwardly into engagement with the rotor 75, which rotor in turn acts to impart pressure to the material being worked upon and force the same downwardly between the stator insert 49 and the rotor 56. This pressure exerts an upward lift to the rotor 56. The grooves 57 and 58 cooperating with the edges 54 and with the annular grooves 55 in the stator insert 49 force the material being worked upon downwardly while simultaneously grinding the material to any degree of fineness desired, the degree of fineness being regulated by the relative rotative movement of the outlet housing 24 and parts carried thereby and the rotor 56. The materials being worked upon after having passed through the stator insert 49 and the rotor 56 are acted upon by the outlet turbine 63 and the materials are forced through the pipe 66. If at this time the valve or tap 85 is closed and the valve 82 is open, it is obvious that such material will pass through the pipe 66 and through the valve or tap 82 into any receptacle provided for the purpose. If, however, it is desired to process the material to as great an extent as possible, the valve or tap 82 is closed and the valve or tap 85 is opened, whereupon the material passed through the pipe 66 by the outlet turbine 63 will pass up through the pipe 83 and out through the valve or tap 85 to be again deposited in the inlet funnel 69. By having the distance between the operating faces of the insert stator 49 and the rotor 56 opened and with the material deposited in the inlet funnel 69, such material may be passed through what is known as a pre-mixing operation by circulating the material in the manner above described. After having been thoroughly pre-mixed, the distance between the cooperating grinding surfaces of the stator insert 49 and the rotor 56 may be regulated and the grinding and premixing takes place simultaneously and when the desired degree of fineness of the material has been obtained, the valve or tap 85 may be closed and the valve or tap 82 opened to allow the completed material to pass out into any suitable receptacle.

With some material it is desirable that the same be processed out of contact with the air or other oxidizing agent and in such case, the device shown in Figs. 10 and 11 may be employed in place of the cylindrical member 79, it being understood that under such circumstances, the pipe 93 within the cylindrical member 86 may be connected by any suitable connecting devices to the outlet pipe 66. As $CO_2$ gas in snow form or the usual dry ice has been found to be an extremely satisfactory material, such may be placed in the wire mesh basket 94 and the pre-mixing as well as the combined pre-mixing and grinding may take place as above described and any excess of pressure due to the evaporation of the $CO_2$ snow, gas or dry ice will be taken care of by means of the safety valve 90, the pressure within the cylindrical member 86 being at all times indicated on the pressure gauge 91.

While I have necessarily shown and described the preferred embodiments of my invention, it is understood that I may vary the size, shape and arrangement of parts comprising my invention within relatively wide limits without departing from the spirit of the invention.

I claim:

1. In a mill of the kind described the combination of a closed supply tank for holding material to be worked upon, means for creating pressure within the tank and for simultaneously refrigerating material being worked upon, a pressure turbine at the discharge end of the supply tank, a turbulence arrestor mounted between the pressure turbine and the discharge end of the supply tank for preventing turbulence of the material being worked upon, a second pressure device for increasing the pressure of the material being worked upon and a combined grinding and homogenizing device associated with said second pressure developing means for grinding material passing thereto and means for circulating the material being worked upon from the tank to the homogenizing device and back to the tank.

2. In a mill of the kind described, the combination of a supply tank, a grinding and homogenizing device associated therewith and operating on material delivered therefrom, a pressure device arranged at the exit end of the supply tank for drawing material from the supply tank and imparting pressure thereto, a second pressure device arranged between the first said pressure device and the grinding and homogenizing device and arranged to receive the material placed under pressure by the first said pressure device and imparting to such material a pressure greater than that imparted by first said pressure device and delivering such material under the increased pressure to the grinding and homogenizing device, and means associated with the supply tank at the exit end thereof and in advance of the first said pressure device for preventing turbulence of the material as it is drawn from the supply tank.

3. In a mill of the kind described, the combination of a supply tank, a turbulence preventer for preventing turbulence of the material to be worked upon, in its passage from the supply tank to a grinding means, a pressure inducing device arranged at the exit end of the supply tank for drawing material from the tank and forcing the same onward to the grinding device, a second pressure inducing device arranged at the exit end of the first said pressure inducing device and receiving material therefrom and imparting a pressure thereto, higher than the pressure induced in the material by the first said pressure device, a grinding and homogenizing device having its entrance end connected with the second said pressure inducing device, said grinding and homogenizing device simultaneously grinding the material being worked upon and imparting to said material at its exit end a pressure greater than the pressure induced by the said pressure inducing device.

4. In a mill of the kind described, the combination of a supply tank, a turbulence preventer for preventing turbulence of the material to be worked upon, in its passage from the supply tank to a grinding means, a pressure inducing device arranged at the exit end of the supply tank for drawing material from the tank and forcing the same onward to the grinding device, a second pressure inducing device arranged at the exit end of the first said pressure inducing device and receiving material therefrom and imparting a pressure thereto higher than the pressure induced in the material by the first said pressure device, a grinding and homogenizing device having its entrance end connected with the second said pressure inducing device, said grinding and homogenizing device simultaneously grinding the material being worked upon and imparting to said material at its exit end a pressure greater than the pressure induced by the said pressure inducing device, and pressure means at the exit end of the grinding and homogenizing device for delivering the ground material to a delivery point.

WILLIAM EPPENBACH.